United States Patent
Reuning et al.

(10) Patent No.: US 10,594,226 B2
(45) Date of Patent: Mar. 17, 2020

(54) ADJUSTABLE ZERO VOLTAGE TO HIGH VOLTAGE POWER SUPPLY

(71) Applicant: Dean Technology Inc., Addison, TX (US)

(72) Inventors: Jan Simon Reuning, Addison, TX (US); Braeden Reid Levine, Addison, TX (US); Erik Steven Haugarth, Addison, TX (US)

(73) Assignee: DEAN TECHNOLOGY INC., Addison, TX (US)

( * ) Notice: Subject to any disclaimer, the term of this patent is extended or adjusted under 35 U.S.C. 154(b) by 0 days.

(21) Appl. No.: 16/538,596

(22) Filed: Aug. 12, 2019

(65) Prior Publication Data

US 2020/0052597 A1   Feb. 13, 2020

Related U.S. Application Data

(60) Provisional application No. 62/718,126, filed on Aug. 13, 2018.

(51) Int. Cl.
| | |
|---|---|
| *H02M 3/337* | (2006.01) |
| *G05F 1/46* | (2006.01) |
| *H02M 3/335* | (2006.01) |

(52) U.S. Cl.
CPC ............ *H02M 3/3376* (2013.01); *G05F 1/46* (2013.01); *H02M 3/33507* (2013.01)

(58) Field of Classification Search
CPC ........... H02M 2001/007; H02M 3/325; H02M 3/335; H02M 3/33507; H02M 3/33523; H02M 3/33569; H02M 3/337; H02M 3/3374

See application file for complete search history.

(56) References Cited

U.S. PATENT DOCUMENTS

| | | | | |
|---|---|---|---|---|
| 9,843,199 | B2 * | 12/2017 | Bosshard | H02J 5/005 |
| 2009/0122578 | A1 * | 5/2009 | Beltran | H02M 3/33507 363/16 |
| 2010/0157632 | A1 * | 6/2010 | Batten | H02M 7/4807 363/74 |
| 2012/0104861 | A1 * | 5/2012 | Kojori | H01M 10/46 307/82 |

* cited by examiner

*Primary Examiner* — Gary L Laxton
(74) *Attorney, Agent, or Firm* — Nolte Intellectual Property Law Group

(57) ABSTRACT

An adjustable zero voltage to high voltage power supply electrically receives a voltage source and electronically receives a control signal. The adjustable zero voltage to high voltage power supply includes a first modulator generator, which provides an adjustable voltage signal equivalent to the operating range of the first modulator generator. A second modulator generator receives the adjustable voltage signal and produces a modulated signal. An adjustable pulse width modulator transmits a clock signal to the second modulator generator to control a frequency of the adjustable voltage signal and cause the second modulator generator to produce a modulated signal. A plurality of integrated circuits is configured to receive a control signal and feedback a signal to the first modulator generator and the adjustable pulse width modulator to change from a fixed frequency to a variable increasing frequency.

16 Claims, 3 Drawing Sheets

ADJUSTABLE ZERO VOLTAGE TO HIGH VOLTAGE POWER SUPPLY

CROSS-REFERENCE TO RELATED APPLICATION

This application claims priority to U.S. Provisional Application No. 62/718,126 filed Aug. 13, 2018, the contents of which are hereby incorporated by reference for all purposes as if expressly set forth herein verbatim to the extent it is not inconsistent with the present disclosure.

FIELD

The present embodiments generally relate to an adjustable zero voltage to high voltage power supply.

BACKGROUND

A need exists for a power supply with an adjustable range from zero to a high voltage, e.g., 60,000 volts.

The present embodiments meet these needs.

BRIEF DESCRIPTION OF THE DRAWINGS

The detailed description will be better understood in conjunction with the accompanying drawings as follows.

Figure 1:
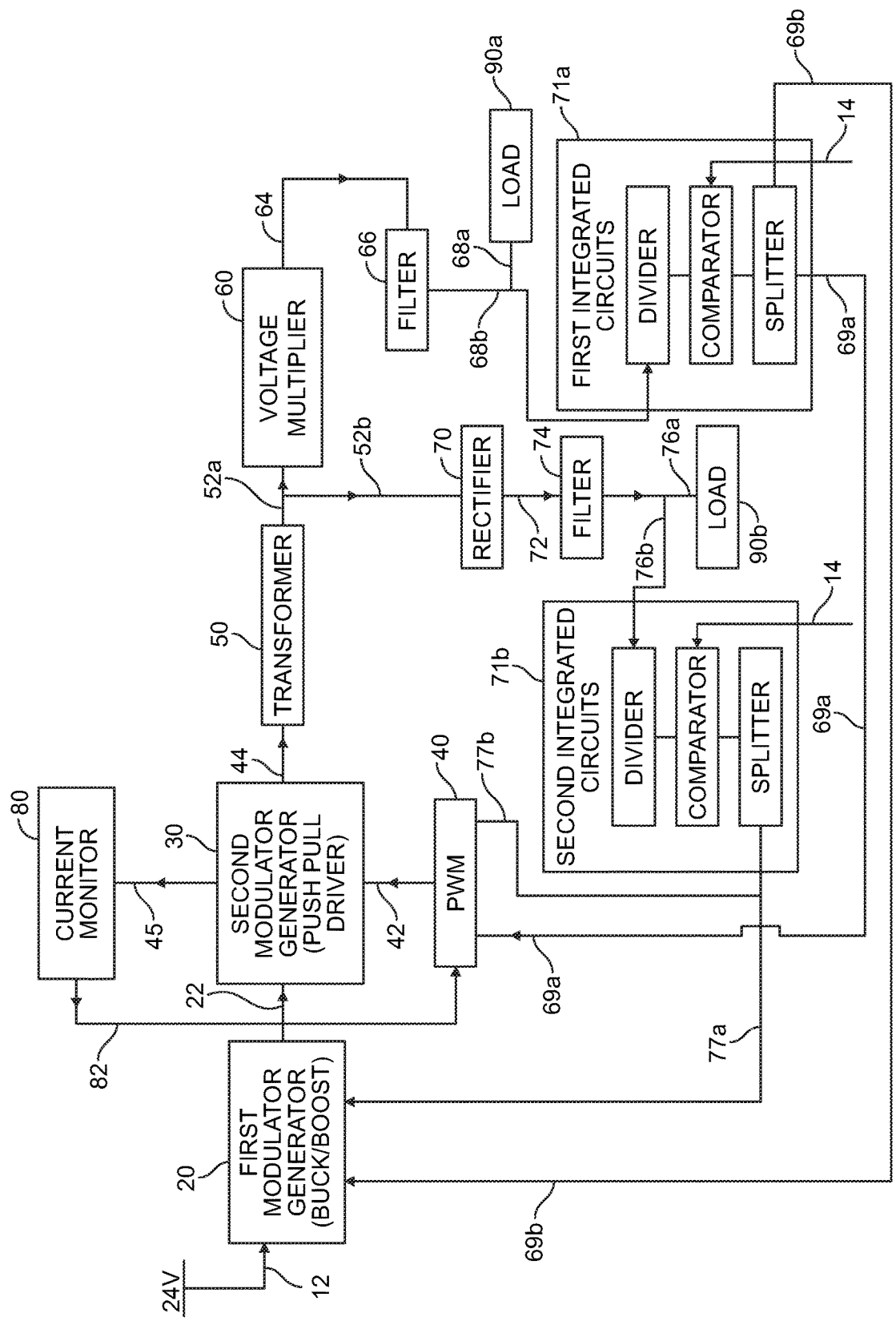
FIG. 1 is a diagram of an example adjustable power supply according to an embodiment.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to an adjustable zero voltage to high voltage power supply electrically receiving an input voltage and electronically receiving a control signal to provide an adjustable output voltage from zero to, e.g., 60,000 volts, in a single integrated unit. The embodiments also relate to methods for providing an adjustable output voltage.

In embodiments, the adjustable power supply zero voltage to high voltage power supply includes a first modulator generator, a second modulator generator, an adjustable pulse width modulator generator, and a transformer. The adjustable power supply also includes at least one of first circuitry including a voltage multiplier, a first filter, and a first plurality of integrated circuits and second circuitry including a rectifier, a second filter, and a second plurality of integrated circuits.

The adjustable zero voltage to high voltage power supply has a first modulator generator which can be a buck or a boost.

The first modulator generator provides an adjustable voltage signal equivalent to the operating range of the first modulator generator.

The adjustable power supply includes a second modulator generator that receives the adjustable voltage signal from the first modulator generator and a clock signal and produces a modulated signal.

The adjustable power supply includes an adjustable pulse width modulator ("PWM") that transmits the clock signal which may also be known as "a frequency signal" to the second modulator generator to control a frequency of the adjustable voltage signal.

The second modulator generator produces a modulated signal that is either a fixed frequency modulated signal, or an increasing frequency modulated signal.

A transformer receives the modulated signal from the second modulator generator and forms an output voltage signal by converting (i) an incoming fixed frequency modulated signal to an increased output voltage signal or (ii) an incoming increasing frequency modulated signal to a decreased output voltage signal.

The output voltage signal from the transformer can be split into a first output voltage signal and a second output voltage signal.

A voltage multiplier connects to the first output voltage signal and generates an increased DC output voltage.

In embodiments, a first filter receives an increased DC output voltage and cleans noise from the voltage, producing a cleaned increased DC output voltage. A first portion of the cleaned increased DC voltage powers a load, and a second portion is fed to a first plurality of integrated circuits.

The first plurality of integrated circuits splits the second portion of the cleaned increased DC output voltage signal into first feedback signal that are simultaneously transmitted to both the first modulator generator, and the adjustable pulse width modulator ("PWM").

In embodiments, a rectifier can be connected to the second output voltage signal generating a rectified DC output voltage.

When a rectifier is used, a second filter receives the rectified DC output voltage and produces a cleaned rectified DC output voltage. A first portion of the cleaned rectified DC output voltage powers a second load and a second portion of the cleaned rectified DC output voltage signal is fed to a second plurality of integrated circuits.

The second plurality of integrated circuits spits the second portion of the cleaned rectified DC output voltage into second feedback signals that are simultaneously transmitted to both the first modulator generator and the adjustable pulse width modulator ("PWM").

These components form an adjustable zero voltage to high voltage power supply with an output voltage range from zero output voltage to a high output voltage like 60,000 Volts to power a load.

This disclosed embodiments can prevent injury and death near a power supply by preventing spikes in the power supply exceeding human endurance and by preventing bloody explosions This disclosed embodiments can provide clean and accurate output. The embodiments provide a stable power source for clear and accurate medical imaging applications, which can allow for early diagnosis of conditions, preventing death and preventing human suffering.

This disclosed embodiments can protect humans from harm by allowing the high voltage system to start at true zero volt when powered up.

This disclosed embodiments can prevent fires. The embodiments provide a clear feedback signal that reduces noise in a power supply. The embodiments cause shut down of the power supply quickly and accurately to prevent fires and explosions in the event of a fault or explosive overcurrent condition due to high voltage.

This disclosed embodiments can be used for portable X-Ray units to provide quick relief to devastated areas, allowing help for doctors in areas destroyed by, for example, earthquakes and other disasters.

The following definitions are used herein:

The term "adjustable pulse width modulator generator" as used herein can refer to a device that varies output pulse widths and frequency based on input voltage signals.

The term "feedback signal" as used herein can refer to an output signal routed back as inputs to the first modulator generator and the adjustable pulse width modulator, as part of a chain of cause and effect that forms a control circuit.

The term "input voltage" as used herein can refer to a variable input voltage that is from an external source to the adjustable power supply zero voltage to high voltage power supply.

The term "load" as used herein can refer to a device requiring the output power in order to operate.

The term "output voltage" as used herein can refer to a steady state signal that can be used by the transformer to create an output voltage signal.

The term "power" as used herein can refer to voltage and current.

The term "power supply" as used herein can refer to an electronic device that supplies electronic energy to an electrical load such as a DC to DC converter or a universal input AC to DC power supply.

The term "voltage multiplier" as used herein can refer to a device that produces a voltage at least 50 percent greater than an input voltage and generates a voltage from, for example 40 volts to 1 million volts. For example, the input voltage could be 20 volts and the voltage multiplier can generate 40 volts. As another example, the input voltage can be 92 volts and the voltage multiplier can generate 184 volts.

The term "adjustable voltage signal" as used herein can refer to a voltage signal that is controllable from, for example, 1.2 volts to 19 volts.

The term "modulator generator" as used herein can refer to a combination of switches that allows a signal's duty cycle to be altered or voltage level to be adjusted.

The term "clock signal" as used herein can refer to a signal that sets the time between switching, also referred to as a frequency signal.

The term "modulated signal" as used herein can refer to a signal that has an altered duty cycle or adjusted voltage level.

The term "transformer" as used herein can refer to a device that can amplify an AC signal.

The term "output voltage signal" as used herein can refer to an increased or decreased signal output voltage of a device.

The term "feedback signal" as used herein can refer to a signal that is returned to a previous device to allow for control.

The term "filter" as used herein can refer to a circuit that reduces ripple noise on a voltage signal.

The term "plurality of integrated circuits" as used herein can refers to a circuit used to divide down an input signal by a ratio, e.g., reducing a high voltage signal to a small voltage signal by a given ratio. The divided down signal is compared to a control signal (set, for example, by a user), and the resulting difference is used as feedback signals.

The term "rectifier" as used herein can refer to a device that converts AC voltage to DC voltage.

The term "control signal" as used herein can refer to a voltage signal transmitted or set in advance by, for example user, for a desired output voltage.

Turning now to the Figures, FIG. 1 depicts an adjustable zero voltage to high voltage power supply electrically receiving an input voltage 12, shown here as 24 volts, and electronically receiving a control signal 14 which is transmitted from or set in advance by, e.g., a customer or user (not shown).

The adjustable zero voltage to high voltage power supply has a first modulator generator 20 providing an adjustable voltage signal 22 equivalent to the operating range of the first modulator generator.

In embodiments, the operating range for a 48 volt boost can range from 24 volts to 48 volts.

In other embodiments, the operating range for a 19 volt buck can range from 1.2 volts to 19 volts.

The power supply can have a second modulator generator 30. In embodiments, the second modulator generator 30 can be a push pull driver.

The second modulator generator 30 receives the adjustable voltage signal 22 and produces a modulated signal 44.

The power supply has an adjustable pulse width modulator ("PWM") 40 transmitting a clock signal 42 to the second modulator generator 30 to control the pulse width and frequency of the modulated signal 44.

In embodiments, also depicted in this FIG. 1, the second modulator generator 30 can connect to a current monitor 80 via a signal 45. The current monitor 80 can transmit a control signal 82 to the adjustable pulse width modulator 40.

A transformer 50 receives the modulated signal 44 and forms an output voltage signal that can be divided into two output voltage signals 52a and 52b.

The transformer 50 converts a fixed frequency modulated signal 44 from the second modulator generator 30 to increased output voltage signals 52a and 52b or can convert an increased frequency modulated signal 44 to decreased output voltage signals 52a and 52b.

A voltage multiplier 60 connected to the output voltage signal 52a generates an increased DC output voltage 64, which is transmitted to a first filter 66 receiving the increased DC output voltage 64 and producing a cleaned increased DC output voltage that can be split into a first portion 68a and a second portion 68b.

The first portion 68a of the cleaned increased DC output voltage can be used to power a first load 90a.

A first plurality of integrated circuits 71a is used to divide down and compare a second portion 68b of the cleaned increased DC output voltage 68b to a control signal 14. The resulting difference is split into two feedback signals 69a and 69b. The feedback signal 69a is transmitted back to the adjustable pulse width modulator ("PWM") 40, and signal 69b is transmitted back to the first modulator generator 20 simultaneously.

A rectifier 70 receives the output voltage signal 52b.

The rectifier 70 generates a rectified DC output voltage 72.

A second filter 74 receives the rectified DC output voltage 72 and produces a cleaned rectified DC output voltage that can be split into a first portion 76a and a second portion 76b.

The first portion 76a of the cleaned rectified DC output voltage can be used to power a second load 90b.

A second plurality of integrated circuits 71b is used to divide down and compare the second portion 76b of the cleaned rectified DC output voltage 76a to a control signal 14. The resulting difference is split into two feedback signals 77a and 77b. The feedback signal 77b is transmitted back to the adjustable pulse width modulator ("PWM") 40, and the feedback signal 77a is transmitted back to the first modulator generator 20 simultaneously.

In embodiments, the first modulator generator 20 is a buck regulator or a boost regulator.

In embodiments, the second modulator generator 30 is a push pull driver.

In embodiments, the power supply is a digital or analog power supply.

In embodiments, the adjustable power supply may be a buck version, a boost version, or both. In the case of a buck version adjustable power supply, components of the boost version may be omitted. In the case of a boost version adjustable power supply, components of the buck version may be omitted. This may be further understood from the examples provided below.

Example 1—(Buck Version with Voltage Multiplier)

An adjustable zero voltage to high voltage power supply is electrically receiving an input voltage of 24 volts and electronically receiving a control signal from a user to control output voltage having a frequency range of 100 kHz to 800 kHz.

The first modulator generator in this example of the adjustable zero voltage to high voltage power supply is a buck converter.

The first modulator generator receives an input voltage of 24 volts and a feedback signal to reduces the voltage to the operating range which is 1.2 volts to 19 volts.

The second modulator generator of this example is a push pull driver.

The second modulator generator receives the adjustable voltage signal ranging from 1.2 volts to 19 volts and a clock signal ranging from 100 kHz to 800 kHz to produce a modulated signal of 1.2 volts to 19 volts with a frequency of 100 kHz to 800 kHz.

An adjustable pulse width modulator ("PWM") transmits a clock signal of 100 kHz to 800 kHz to the second modulator generator to control the frequency of the adjustable voltage signal from 100 kHz to 800 kHz.

A transformer receives the modulated signal from 1.2 volts to 19 volts and 100 kHz to 800 kHz to form an output voltage signal from 0 volts to 2200 volts.

In this example, a first circuitry may include a voltage multiplier, that is connected to the output voltage signal from the transformer. In embodiments, the voltage multiplier generates an increased DC output voltage.

In this example, the first circuitry may also include a first filter receiving the increased DC output voltage and producing a cleaned increased DC output voltage which becomes a signal that is transmitted to the first plurality of integrated circuits and the load. In this example, the filter removes noise from the increased DC output voltage to produce the cleaned increased DC output voltage signal.

In this example, the first circuitry may also include a first plurality of integrated circuits which is used to divide down, compare, and split the cleaned increased DC output voltage signal into feedback signals, enabling a portion of the cleaned increased DC output voltage to feed back to the first modulator generator and the adjustable pulse width modulator "PWM" simultaneously.

The combination of components forms an adjustable zero voltage to high voltage power supply with an output voltage range from zero output voltage to a high output voltage.

Example 2 (Boost Version with Rectifier)

An adjustable zero voltage to high voltage power supply is electrically receiving an input voltage of 24 volts and electronically receiving a control signal from a user to control output voltage having a frequency range of 100 kHz to 800 kHz.

The first modulator generator in this example of the adjustable zero voltage to high voltage power supply is a boost converter.

The first modulator generator receives an input voltage of 24 volts and a feedback signal to increase the voltage to the operating range which is 24 volts to 48 volts.

The second modulator generator of this example is a push pull driver.

The second modulator generator receives the adjustable voltage signal ranging from 24 volts to 48 volts and a clock signal ranging from 100 kHz to 800 kHz to produce a modulated signal of 24 volts to 48 volts with a frequency of 100 kHz to 800 kHz.

An adjustable pulse width modulator ("PWM") transmits a clock signal of 100 kHz to 800 kHz to the second modulator generator to control the frequency of the adjustable voltage signal from 100 kHz to 800 kHz.

A transformer receives the modulated signal from 24 volts to 48 volts and 100 kHz to 800 kHz to form an output voltage signal from 0 volts to 5000 volts.

In this example, a second circuitry may include a rectifier, that is connected to the output voltage signal from the transformer to generate a rectified DC output voltage.

In this example, the second circuitry may include a second filter that receives the rectified DC output voltage producing a cleaned rectified DC output voltage which becomes a signal that is transmitted to the second plurality of integrated circuits and the load. In this example, the filter removes noise from the rectified DC output voltage to produce the cleaned increased DC output voltage signal.

In this example, the second circuitry may include a second plurality of integrated circuits which is used to divide down, compare, and split the cleaned increased DC output voltage signal into feedback signals, enabling a portion of the cleaned increased DC output voltage to feed back to the first modulator generator and the adjustable pulse width modulator "PWM" simultaneously.

The combination of components forms an adjustable zero voltage to high voltage power supply with an output voltage range from zero output voltage to a high output voltage.

Example 3—(Buck Boost Version with Voltage Multiplier)

An adjustable zero voltage to high voltage power supply is electrically receiving an input voltage of 12 volts and electronically receiving a control signal from a user to control output voltage having a frequency range of 125 kHz to 450 kHz.

The first modulator generator in this example of the adjustable zero voltage to high voltage power supply is a buck boost converter.

The first modulator generator receives an input voltage of 12 volts and a feedback signal to reduce or increase the voltage to the operating range which is 1.2 volts to 48 volts.

The second modulator generator of this example is a push pull driver.

The second modulator generator receives the adjustable voltage signal ranging from 1.2 volts to 48 volts and a clock signal ranging from 125 kHz to 450 kHz to produce a modulated signal of 1.2 volts to 48 volts with a frequency of 125 kHz to 450 kHz.

An adjustable pulse width modulator ("PWM") transmits a clock signal of 125 kHz to 450 kHz to the second modulator generator to control the frequency of the adjustable voltage signal from 125 kHz to 450 kHz.

A transformer receives the modulated signal from 1.2 volts to 48 volts and 125 kHz to 450 kHz to form an output voltage signal from 0 volts to 10000 volts.

In this example, a first circuitry may include a voltage multiplier, that is connected to the output voltage signal from the transformer. In embodiments, the voltage multiplier generates an increased DC output voltage.

In this example, the first circuitry may also include a first filter receiving the increased DC output voltage producing a cleaned increased DC output voltage which becomes a signal that is transmitted to the first plurality of integrated circuits and the load. In this example, the filter removes noise from the increased DC output voltage to produce the cleaned increased DC output voltage signal.

In this example, the first circuitry may also include a first plurality of integrated circuits which is used to divide down, compare, and split the cleaned increased DC output voltage signal into feedback signals, enabling a portion of the cleaned increased DC output voltage to feed back to the first modulator generator and the adjustable pulse width modulator "PWM" simultaneously.

The combination of components forms an adjustable zero voltage to high voltage power supply with an output voltage range from zero output voltage to a high output voltage.

Example 4—(Buck Boost Version with Rectifier)

An adjustable zero voltage to high voltage power supply is electrically receiving an input voltage of 24 volts and electronically receiving a control signal from a user to control output voltage having a frequency range of 100 kHz to 1 MHz The first modulator generator in this example of the adjustable zero voltage to high voltage power supply is a buck boost converter.

The first modulator generator receives an input voltage of 24 volts and a feedback signal to reduces or increase the voltage to the operating range which is 1.2 volts to 48 volts.

The second modulator generator of this example is a push pull driver.

The second modulator generator receives the adjustable voltage signal ranging from 1.2 volts to 48 volts and a clock signal ranging from 100 kHz to 1 MHz to produce a modulated signal of 1.2 volts to 48 volts with a frequency of 100 kHz to 1 MHz An adjustable pulse width modulator ("PWM") transmits a clock signal of 100 kHz to 1 MHz to the second modulator generator to control the frequency of the adjustable voltage signal from 100 kHz to 1 MHz.

A transformer receives the modulated signal from 1.2 volts to 48 volts and 100 kHz to 1 MHz to form an output voltage signal from 0 volts to 15000 volts.

In this example, a second circuitry may include a rectifier, that is connected to the output voltage signal from the transformer to generate a rectified DC output voltage.

In this example, the second circuitry may include a second filter that receives the rectified DC output voltage producing a cleaned rectified DC output voltage which becomes a signal that is transmitted to the second plurality of integrated circuits and the load. In this example, the filter removes noise from the rectified DC output voltage to produce the cleaned increased DC output voltage signal.

In this example, the second circuitry may include a second plurality of integrated circuits which is used to divide down, compare, and split the cleaned increased DC output voltage signal into feedback signals, enabling a portion of the cleaned increased DC output voltage to feed back to the first modulator generator and the adjustable pulse width modulator "PWM" simultaneously.

Figure 2:
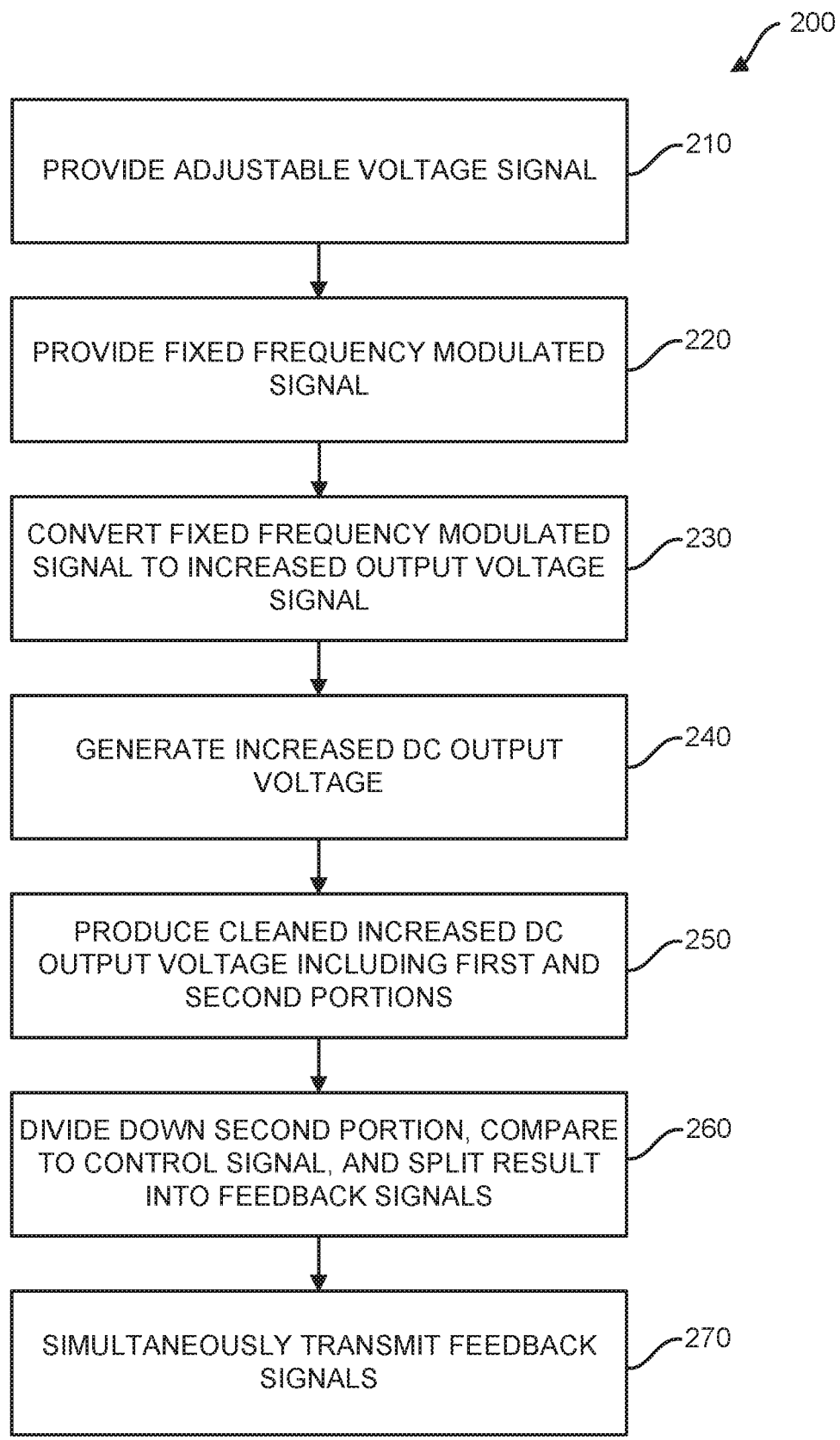
FIG. 2 is a flow chart of a process for providing an adjustable output voltage according to an embodiment.

The combination of components forms an adjustable zero voltage to high voltage power supply with an output voltage range from zero output voltage to a high output voltage FIG. 2 is a flow chart of a method for providing an adjustable output voltage according to an embodiment. The method 200 begins at step 210 at which an adjustable voltage signal is provided by, for example, a first modulator generator.

At step 220 the adjustable voltage signal is used to provide a modulated signal included a fixed frequency modulated signal by, for example, a second modulator generator.

At step 230, the fixed frequency modulated signal is converted to an increased output voltage signal by, for example, a transformer.

At step 240, an increased DC output voltage is generated by, for example, a voltage multiplier.

At step 250, a cleaned increased DC output voltage including first and second portions is produced by, for example, a filter. The first portion may power a load.

At step 260, the second portion of the cleaned increased DC output voltage is divided down, the divided down second portion is compared to a control signal, and a resulting difference between the divided down second portion and the control signal is split into two feedback signals by, for example, a plurality of integrated circuits.

At step 270, the two feedback signals are simultaneously transmitted to, for example, the first modulator generator and the adjustable pulse with modulator ("PWM").

Figure 3:
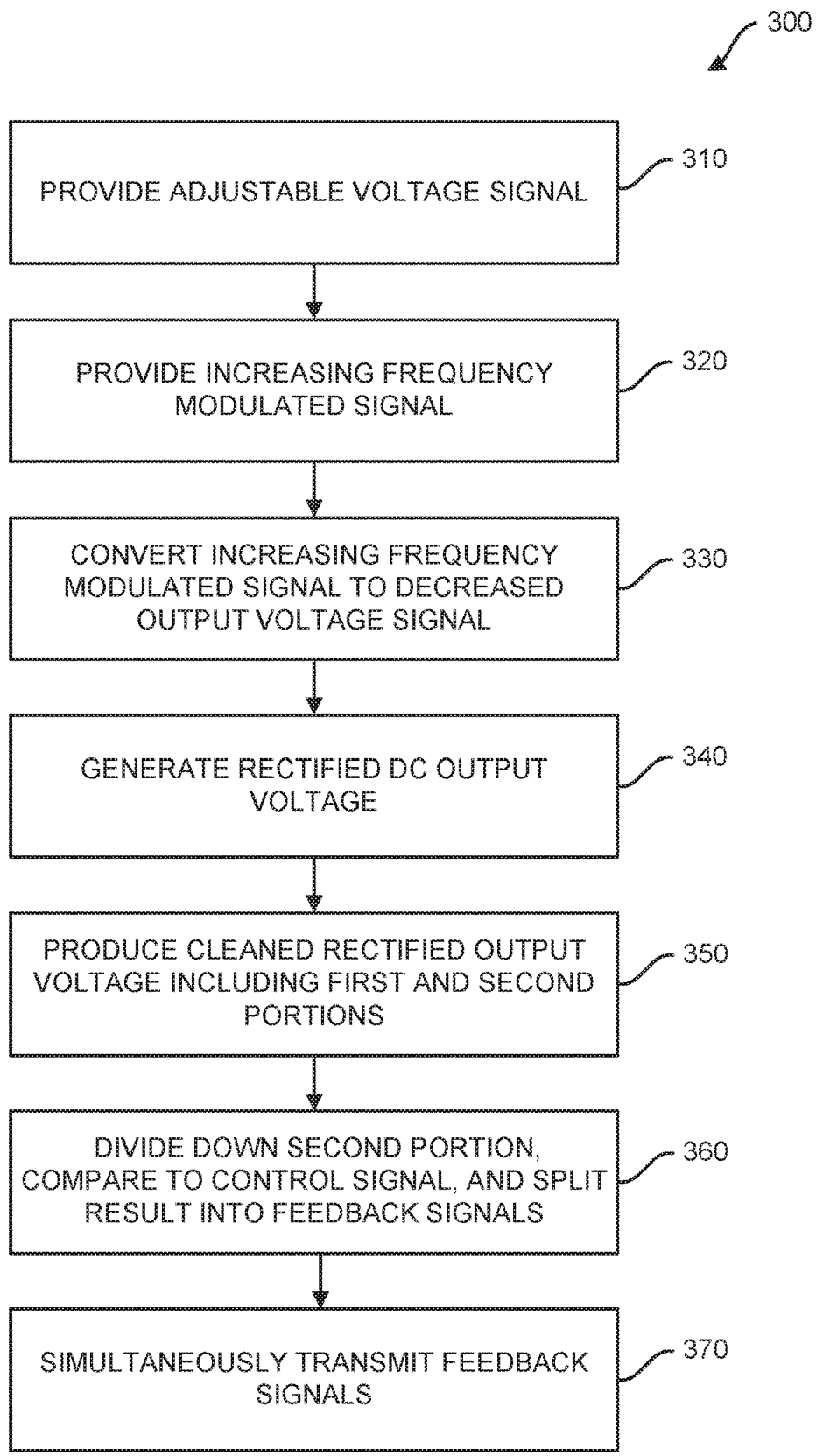
FIG. 3 is a flow chart of a process for providing an adjustable output voltage according to another embodiment.

FIG. 3 is a flow chart of a method for providing an adjustable output voltage according to an embodiment. The method 300 begins at step 310 at which an adjustable voltage signal is provided by, for example, a first modulator generator.

At step 320, the adjustable voltage signal is used to provide a modulated signal including an increasing frequency modulated signal by, for example, a second modulator generator.

At step 330, the increasing frequency modulated signal is converted to a decreased output voltage signal by, for example, a transformer.

At step 340, a rectified DC output voltage is generated by, for example, a rectifier.

At step 350, a cleaned rectified DC output voltage including first and second portions is produced by, for example, a filter. The first portion may power a load.

At step 360, the second portion of the cleaned rectified DC output voltage is divided down, the divided down second portions is compared to a control signal, and a resulting difference between the divided down second portion and the control signal is split into two feedback signals by, for example, a plurality of integrated circuits.

At step 370, the two feedback signals are simultaneously transmitted to, for example, the first modulator generator and the adjustable pulse with modulator ("PWM").

While these embodiments have been described with emphasis on the embodiments, it should be understood that within the scope of the appended claims, the embodiments might be practiced other than as specifically described herein.

What is claimed is:
1. An adjustable power supply, comprising:
   a. a first modulator generator to provide an adjustable voltage signal equivalent to an operating range of the first modulator generator;
   b. a second modulator generator to receive the adjustable voltage signal and clock signal to produce a modulated signal comprising: a fixed frequency modulated signal, or an increasing frequency modulated signal;
   c. an adjustable pulse width modulator to receive a feedback signal and to generate a clock signal;
   d. a transformer to receive the modulated signal, form an output voltage signal, and convert at least one of the fixed frequency modulated signal to an increased output voltage signal and the increasing frequency modulated signal to a decreased output voltage signal; and
   e. at least one of a first circuitry and a second circuitry, the first circuitry comprising:
      i. a voltage multiplier to receive the increased output voltage and generate an increased DC output voltage;
      ii. a first filter to receive the increased DC output voltage and produce a cleaned increased DC output voltage, wherein a first portion of the cleaned increased DC output voltage powers a first load; and
      iii. a first plurality of integrated circuits to divide down a second portion of the cleaned increased DC output voltage, compare the divided down second portion to a control signal, split a resulting difference between the divided down second portion and the control signal into first feedback signals and simultaneously transmit the first feedback signals to the first modulator generator and the adjustable pulse width modulator ("PWM"),
   the second circuitry comprising:
      i. a rectifier to receive the decreased output voltage signal and generate a rectified DC output voltage;
      ii. a second filter to receive the rectified DC output voltage and produce a cleaned rectified DC output voltage, wherein a first portion of the cleaned rectified DC output voltage powers a second load; and
      iii. a second plurality of integrated circuits to divide down a second portion of the cleaned rectified DC output voltage, compare the divided down second portion to a control signal, split a resulting difference between the divided down second portion and the control signal into second feedback signals and simultaneously transmit the second feedback signals to the first modulator generator and the adjustable pulse width modulator ("PWM"),
   the adjustable power supply forming an output voltage with a range from zero output voltage to a high output voltage.

2. The adjustable power supply of claim 1, wherein the first modulator generator is a buck regulator.
3. The adjustable power supply of claim 1, wherein the first modulator generator is a boost regulator.
4. The adjustable power supply of claim 1, wherein the second modulator generator is a push pull driver.
5. The adjustable power supply of claim 1, wherein the adjustable power supply is a digital power supply.

6. The adjustable power supply of claim 1, wherein the adjustable power supply is an analog power supply.
7. A method for providing, by an adjustable power supply, an adjustable output voltage, comprising:
   providing, by a first modulator generator, an adjustable voltage signal equivalent to an operating range of the first modulator generator;
   providing, by a second modulator generator, a modulated signal comprising a fixed frequency modulated signal using the adjustable voltage signal while a clock signal is transmitted to the second modulator generator by an adjustable pulse width modulator ("PWM");
   converting, by a transformer, the fixed frequency modulated signal to an increased output voltage signal;
   generating, by a voltage multiplier, an increased DC output voltage;
   producing, by a filter, a cleaned increased DC output voltage, wherein a first portion of the cleaned increased DC output voltage powers a load;
   dividing down, by a plurality of integrated circuits, a second portion of the cleaned increased DC output voltage;
   comparing, by the plurality of integrated circuits, the divided down second portion with a control signal;
   splitting, by the plurality of integrated circuits, a resulting difference between the divided down second portion and the control signal into two feedback signals; and
   simultaneously transmitting the two feedback signals to the first modulator generator and the adjustable pulse width modulator ("PWM").

8. The method of claim 7, wherein the first modulator generator is a buck regulator.
9. The method of claim 7, wherein the second modulator generator is a push pull driver.
10. The method of claim 7, wherein the adjustable power supply is a digital power supply.
11. The method of claim 7, wherein the adjustable power supply is an analog power supply.
12. A method for providing, by an adjustable power supply, an adjustable output voltage, comprising:
   providing, by a first modulator generator, an adjustable voltage signal equivalent to an operating range of the first modulator generator;
   providing, by a second modulator generator, a modulated signal comprising an increasing frequency modulated signal using the adjustable voltage signal while a clock signal is transmitted to the second modulator generator by an adjustable pulse width modulator ("PWM");
   converting, by a transformer, the increasing frequency modulated signal to a decreased output voltage signal; and
   generating, by a rectifier, a rectified DC output voltage suing the decreased output voltage signal;
   producing, by a filter, a cleaned rectified DC output voltage, wherein a first portion of the cleaned rectified DC output voltage powers a load;
   dividing down, by a plurality of integrated circuits, a second portion of the cleaned rectified DC output voltage,
   comparing the divided down second portion to a control signal;
   splitting a resulting difference between the divided down second portion into two feedback signals; and
   simultaneously transmitting the two feedback signals to the first modulator generator and the adjustable pulse width modulator ("PWM").

13. The method of claim 12, wherein the first modulator generator is a boost regulator.

14. The method of claim 12, wherein the second modulator generator is a push pull driver.

15. The method of claim 12, wherein the adjustable power supply is a digital power supply.

16. The method of claim 12, wherein the adjustable power supply is an analog power supply.

* * * * *